United States Patent [19]

Ohkubo et al.

[11] Patent Number: 4,563,694

[45] Date of Patent: Jan. 7, 1986

[54] IMAGE INFORMATION RECORDING APPARATUS

[75] Inventors: Masaharu Ohkubo, Yokohama; Yoshihiro Murasawa, Kawasaki; Yasumasa Ohtsuka; Jun Asai, both of Yokohama, all of Japan

[73] Assignee: Canon Kabushiki Kaisha, Tokyo, Japan

[21] Appl. No.: 577,239

[22] Filed: Feb. 6, 1984

[30] Foreign Application Priority Data

Feb. 10, 1983 [JP] Japan ................................ 58-20733

[51] Int. Cl.$^4$ ........................................ G01D 15/14

[52] U.S. Cl. ........................................ 346/160

[58] Field of Search ................ 346/108, 160; 358/300, 358/302; 355/3 R

[56] References Cited

U.S. PATENT DOCUMENTS

| | | | |
|---|---|---|---|
| 4,375,067 | 1/1983 | Kitamura | 346/160 |
| 4,408,871 | 10/1983 | Kojima | 358/300 |
| 4,432,634 | 2/1984 | Tabuchi | 346/160 X |
| 4,500,195 | 2/1985 | Hosono | 355/3 R |

*Primary Examiner*—Thomas H. Tarcza

*Attorney, Agent, or Firm*—Fitzpatrick, Cella, Harper & Scinto

[57] ABSTRACT

An image information recording apparatus wherein a photosensitive member is scanned with a laser beam corresponding to the information signal of an image to be recorded, the power of the laser beam being controlled in accordance with the wavelength of the laser beam and the sensitivity of the photosensitive member.

24 Claims, 8 Drawing Figures

IMAGE INFORMATION RECORDING APPARATUS

BACKGROUND OF THE INVENTION

1. Field of the Invention

The present invention relates to an image information recording apparatus wherein a photosensitive member is scanned by a laser beam corresponding to the information signal of an image to be recorded.

2. Description of the Prior Art

In such an image information recording apparatus, a semiconductor laser has become used as a light source. It is known that the oscillating wavelength range of the semiconductor laser varies depending on its manufacturing conditions. On the other hand, the spectral sensitivity of a photosensitive member is different depending on the wavelength. For the light of relatively long wavelength from the semiconductor laser, for example, a slight change in wavelength of the laser beam results in fairly great change of sensitivity of an electrophotographic type photosensitive member. Therefore, if semiconductor lasers having different bands of oscillating wavelength are operated with the same power, the resulting images will have different characteristics such as density, even if the spectral sensitivity of the photosensitive member is the same.

On the other hand, the sensitivity of photosensitive members also may vary for manufactured lots. If a semiconductor laser is energized by the same power, the resulting images will have different characteristics such as densities, depending on the photosensitive members used.

SUMMARY OF THE INVENTION

It is an object of the present invention to provide an apparatus which can record image information with higher quality.

Another object of the present invention is to provide an apparatus which can record image information with higher quality if the wavelength of a laser beam scanning a photosensitive member is changed or even if the sensitivity of a photosensitive member scanned by a laser beam is varied.

These and other objects, features and advantages of the present invention will become more apparent upon a consideration of the following description of the preferred embodiment of the present invention taken in conjunction with the accompanying drawings.

DESCRIPTION OF THE PREFERRED EMBODIMENTS

Figure 1:
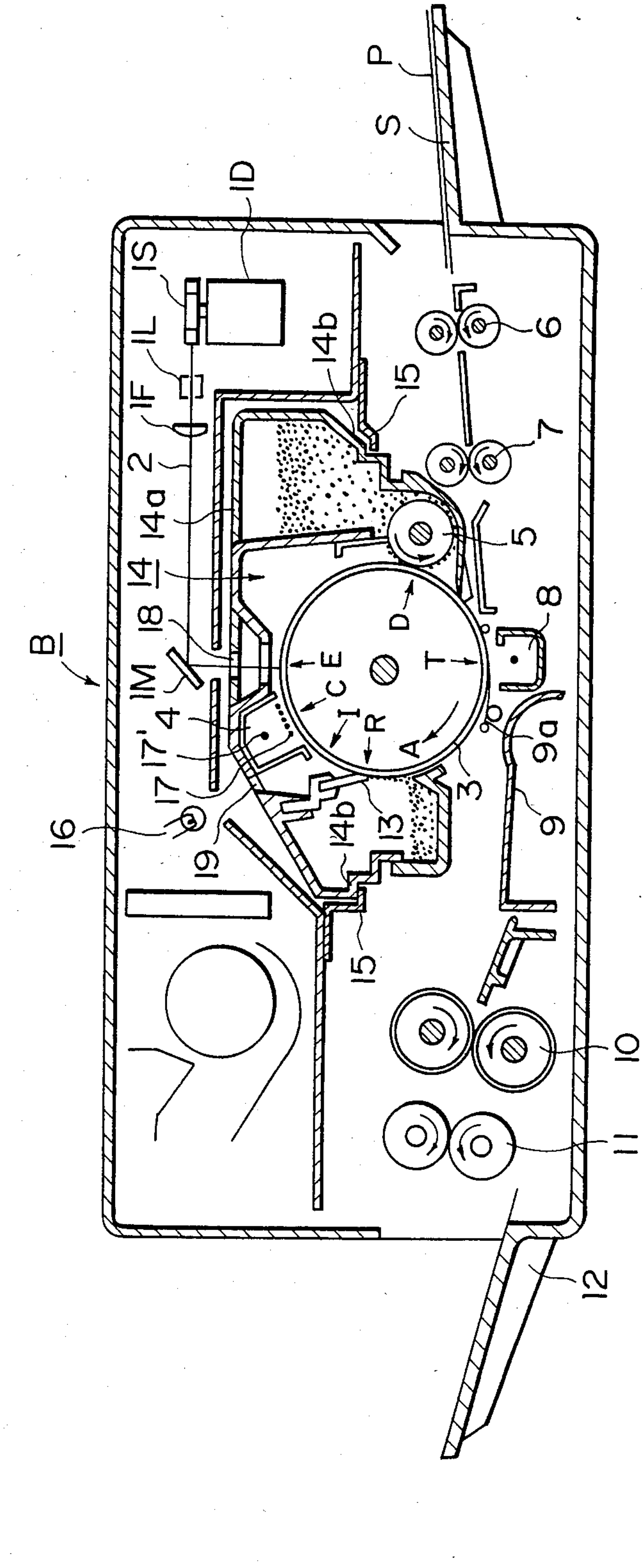
FIG. 1 is a sectional view of one embodiment of the present invention.

Referring to FIG. 1, there is shown a semiconductor laser source 1L which can intermittently be driven by information signals of an image to be recorded from a computer, word processor, facsimile transmitter or the like. A laser beam 2 oscillated in the laser source 1L in accordance with each of the above signals is incident on a polygonal mirror 1S which is rotationally driven by a motor 1D. As the polygonal mirror 1S is rotated, the laser beam 2 is scanningly deflected. The laser beam 2 passes through an imaging lens 1F such as a well-known f-$\theta$ lens or the like toward a mirror 1M whereat the laser beam is then reflected to an electrophotographic type photosensitive drum 3 to form a spot-like image thereon, the photosensitive drum 3 being rotated in the direction of arrow A in FIG. 1. Thus, the photosensitive drum 3 will repeatedly be scanned by the laser beam in the direction substantially perpendicular to the direction of arrow A. The wavelength of the oscilated beam from the semiconductor laser source 1L is normally in the range of 770 nm to 800 nm. It is, therefore, preferred that the electrophotographic type photosensitive layer on the outer periphery of the drum 3 is made of a photosensitive material sensible to the above wavelength, such as organic photoconductive material of metallic phthalocyanine, photoconductive material of selenium or others.

A charger 4 is located at a charging section C to substantially uniformly charge the photosensitive drum 3. In the present embodiment, a grid 17 is disposed between the photosensitive drum 3 and a corona discharge electrode 17' of the charger 4 and spaced away from the outer periphery of the photosensitive drum 3 by a predetermined distance such that the sensitizing charge will be effected further uniformly and that the potential on the photosensitive drum 3 will be stabilized. As will be described hereinafter, the grid 17 is connected with a voltage source means which is in turn electrically grounded. When a corona discharge current is supplied to the charger, a constant voltage is applied to the grid 17 to control the amount of corona discharge current to be applied to the photosensitive drum 3. Thus, the surface potential on the photosensitive drum 3 is controlled. After being charged by this charger 4, the photosensitive drum 3 is scanned by the laser beam 2 modulated in accordance with said information signals of an image to be recorded so that an electrostatic latent image is formed thereon at a laser beam exposure section E. In the present embodiment, a portion of the photosensitive drum 3 on which the toner is to be deposited, that is, a portion on which a visualized image is to be placed, is the portion that is irradiated by the laser beam and free from the charge which has been provided by the charger 4. This is called "image scan system". The image scan system is used because it is advantageous over the background scan system, in that images obtained by the use of the image scan system are sharper and in that the laser source is operated for a reduce period of time, resulting in increased service life.

At the developing section D, the electrostatic latent image is visualized by a developing device 5 to form a toner image. In this connection, the toner has been charged into such a polarity that it can be deposited on the area of the photosensitive drum 3 irradiated by the laser beam 2, that is, the bright potential area.

On the other hand, one of sheets P placed on a tray S is fed into the transfer section T under the action of feed rollers 6 and registration rollers 7 which are rotated in such a timing that the sheet P can positionally be registered with the toner image on the photosensitive drum 3 at the transfer station. Thus, the toner image will be transferred from the photosensitive drum 3 onto the sheet P under the action of a transfer charger 8. Thereafter, the sheet P is separated from the drum 3 by separating means 9*a* and transported through a guide 9 to a fixing device 10, whereat the transferred toner image is fixed to the sheet P. The sheet P having the fixed toner image is then discharged to a tray 12 by discharge rollers 11.

After the transfer step, the residual toner on the surface of the photosensitive drum 3 is removed therefrom by a cleaner 13 at the cleaning station R. Subsequently, the photosensitive drum 3 is exposed uniformly to the light from a pre-exposure light source 16 at the pre-exposure station I. Thus, the charge on the photosensitive drum 3 is removed by the exposure to the light source 16 to prevent the creation of ghost image, for example. The light source 16 may be in the form of a halogen lamp, glow lamp, LED or the like. Optical fibers, cylindrical lens or any other suitable means may be utilized to introduce the uniform light from the light source 16 to the photosensitive drum 3. After the pre-exposure step, the drum 3 is charged by the charger 4 after the pre-exposure step.

Figure 2:
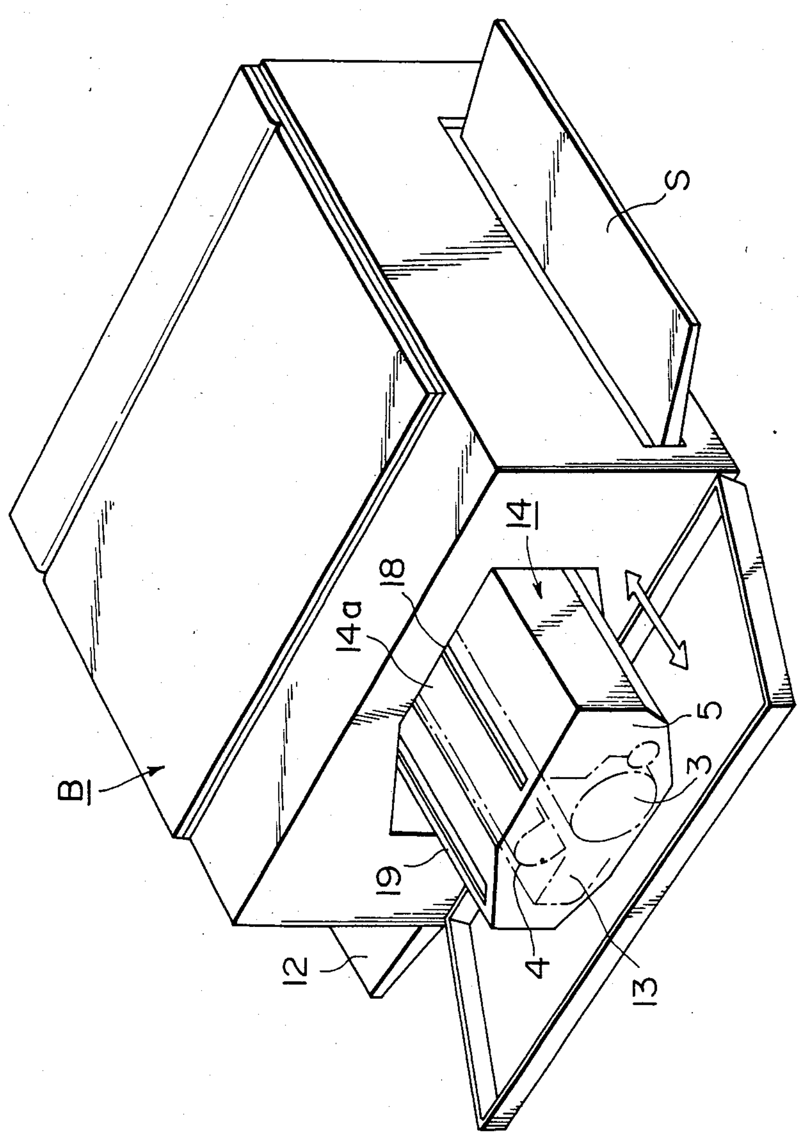
FIG. 2 illustrates a cartridge being mounted in or removed from the machine body.

In the present embodiment, the drum 3, charger 4, developing device 5 and cleaner 13 are contained in a frame 14*a* to define a process cartridge 14. As shown in FIG. 2, this cartridge 14 can detachably be mounted in the main assembly of the apparatus (machine body) B. When the cartridge 14 is to be mounted in the machine body, sliding portions 14*b* on the frame body 14*a* of the process cartridge 14 are guided by guides 15. Thus, the used-up cartridge 14 can be replaced by a new cartridge 14, for example, if the service life of the photosensitive drum 3 has expired.

The frame 14*a* of the cartridge 14 is provided with an opening 18 through which the laser beam passes and another opening 19 through which the pre-exposure light from the light source 16 passes. After passing through these openings 18 and 19, the laser beam 2 and pre-exposure light are incident on the photosensitive drum 3.

The beam scan system consisting of the means 1L, 1S, 1D, 1F and 1M and the transfer sheet conveying system consisting of the pre-exposure light source 16, transfer charger 8 and the means S, 6, 7, 9*a*, 9, 10, 11 and 12 are disposed within the machine body B. On the contrary, the charger 4, developing device 5, cleaner 13 may all, or at least one of them, may be disposed within the machine body rather than in the cartridge 14.

Figure 3:
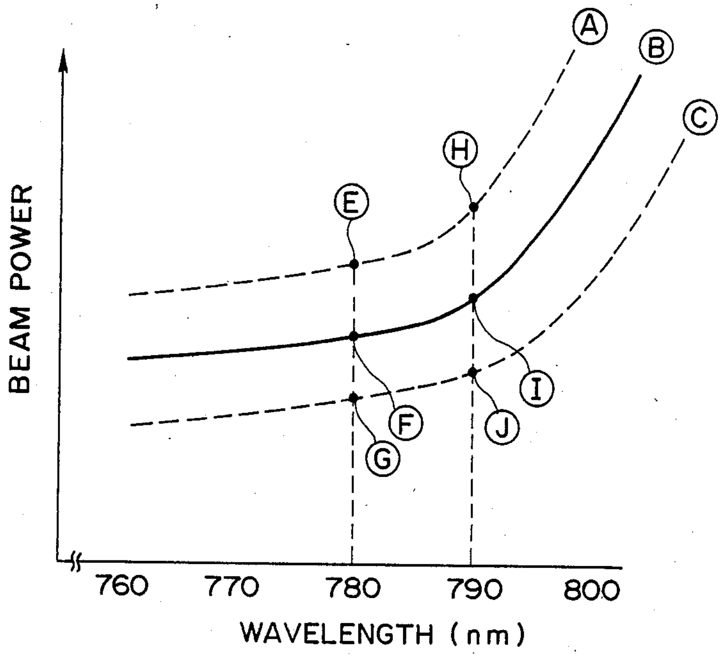
FIG. 3 is a graph showing relationships among the wavelength of a beam, the sensitivity of a photosensitive member and the power of the beam.

FIG. 3 is a graph diagrammatically showing a relationship between the wavelength of the laser beam and the sensitivity of the electrophotographic type photosensitive member, wherein the horizontal axis denotes the wavelength of the laser beam and the vertical axis designates the relative sensitivity. The sensitivity is represented by the power of the laser beam required to obtain the same bright potential. Accordingly, the upper part of the vertical axis shows less sensitivity than that in the lower part thereof.

In FIG. 3, a curve Ⓑ represents the sensitive characteristics of a photosensitive member having a standard sensitivity; a curve Ⓐ depicts the sensitive characteristics of a photosensitive member having a permissible minimum sensitivity; and a curve Ⓒ shows the sensitive characteristics of a photosensitive member having a permissible maximum sensitivity.

As will be understood from the graph, the photosensitive members have a significant wavelength dependence in the ranges near 760 nm–800 nm which include the oscillating wavelength of the semiconductor laser. If the oscillating wavelength of a semiconductor laser used is equal to 780 nm, the power of the laser beam will be set at Ⓕ for a photosensitive member having its sensitivity equal to or near Ⓑ. The power of the laser beam will be set at Ⓔ for a photosensitive member having its sensitivity equal to or near Ⓐ; and the laser beam power will be set at Ⓖ for a photosensitive member having its sensitivity equal to or near Ⓒ. For example, the power of the laser beam may be set at Ⓔ for a photosensitive member having its sensitivity lower than a middle value between Ⓐ and Ⓑ; the power of the laser beam may be set at Ⓕ for a photosensitive member having its standard sensitivity higher than the middle value between Ⓐ and Ⓑ but lower than the value between Ⓑ and Ⓒ; and the beam power may be set at Ⓖ for a photosensitive member having its sensitivity higher than the value between Ⓑ and Ⓒ. In such a manner, the potential on an area of the photosensitive member on which the toner is to be deposited, that is, the bright-area potential $V_L$ can be restricted into a relatively small range, even if the photosensitive members have varied sensitivities.

Further, the longer the wavelength of the laser beam results in the lower sensitivity of a photosensitive member having such characteristics as shown in FIG. 3 is. Although the semiconductor laser has been exemplified to have the wavelength of its oscillated beam which is equal to 780 nm, another semiconductor laser having the wavelength of its oscillated beam equal to 790 nm has to have a beam power set at Ⓘ for a photosensitive member having standard sensitivity. This beam power Ⓘ is larger than the beam power Ⓕ. Also, the beam power is set at Ⓗ, higher than Ⓔ, for a photosensitive member having a lower sensitivity, and set at Ⓙ, higher than Ⓖ, for a photosensitive member having a higher sensitivity.

Moreover, when a semiconductor laser is used with its oscillated beam having a wavelength in the range not lower than 780 nm and not higher than 785 nm, the laser beam power will be set at Ⓔ for a photosensitive member having its lower sensitivity; at Ⓕ for a photosensitive member having a standard sensitivity; and at Ⓖ for a photosensitive member having its higher sensitivity. Also, when a semiconductor laser is utilized with its oscillated beam having a wavelength larger than 785 nm but equal to or smaller than 790 nm, the laser beam power will be set at Ⓗ for a photosensitive member having its lower sensitivity; at Ⓘ for a photosensitive member having a standard sensitivity; and at Ⓙ for a photosensitive member having its higher sensitivity.

In such a manner, the potential of the area on which the toner is to be deposited, that is, the bright-area potential $V_L$ can be changed less to maintain the density of the toner image substantially constant, even if the oscillated beam from the semiconductor is varied.

For example, if a semiconductor laser is used with its oscillated beam having a wavelength in the range not lower than 780 nm and not higher than 785 nm in such a system that utilizes an organic photoconductive member having a photosensitive layer of phthalocyanine as an electrophotographic type photosensitive member, the power of laser beam will be set at 10.5 $\mu J/cm^2$ for a photosensitive member having a lower sensitivity, at 9.5 $\mu J/cm^2$ for a photosensitive member having a standard sensitivity, and at 8.5 $\mu J/cm^2$ for a photosensitive member having a higher sensitivity. On the other hand, a semiconductor laser having its oscillated beam wavelength larger than 785 nm but equal to or smaller than 790 nm may have its beam power which is set at 11.5 $\mu J/cm^2$ for the lower sensitivity photosensitive member, at 10.5 $\mu J/cm^2$ for the standard sensitivity photosensitive member, and at 9.5 $\mu J/cm^2$ for the higher sensitivity photosensitive member. Of course, the above settings of the laser beam power should be determined depending on the kinds of the photosensitive members used and the variations range of the oscillated beam wavelengths of the semiconductor lasers used.

In the previous embodiment, the range of sensitivity in the photosensitive member is divided into three sub-ranges while the range of wavelength in the laser beam is divided into two sub-ranges. The beam power was selected from one of the various combinations of the sub-ranges of sensitivity and the sub-range of wavelength. However, the range of sensitivity may be divided into two or four or more sub-ranges while at the same time the range of wavelength may be divided into three or more sub-ranges. Furthermore, the laser beam power may be set continuously, rather than stepwise, depending on the sensitivity and the wavelength.

Figure 4:
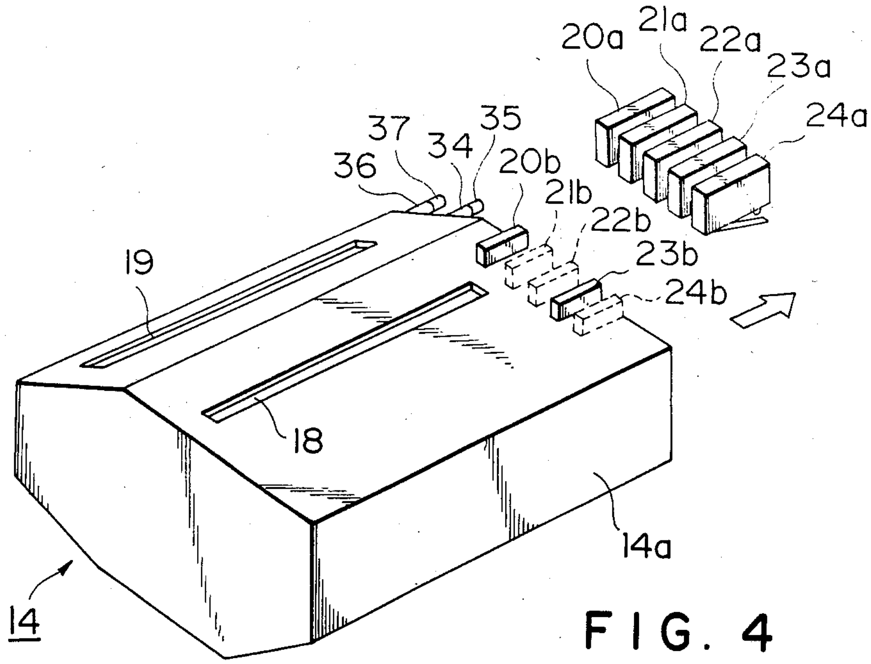
FIG. 4 is a perspective view showing means for transmitting information of the sensitivity and chargeeability in a photosensitive member to control means.

Referring to FIG. 4, there are shown microswitches MS *20a, 21a, 22a, 23a* and *24a* which are fixedly mounted in the machine body B of the electrophotographic system shown in FIGS. 1 and 2. Microswitches MS 20*a* and 21*a* are used to regulate the power of a laser beam correspondingly to the sensitivity of a photosensitive member used. Cams 20*b* and 21*b* may be adhered to the frame or casing 14*a* of the cartridge 14 at the respective positions corresponding to the sensitivity of a photosensitive member 3 contained within the cartridge 14 by the use of adhesive or the like. The cam 20*b* is secured to the frame 14*a* if a higher photosensitive member is used. The cam 21*b* is secured to the frame 14*a* if a standard photosensitive member is used. If a lower photosensitive member is used, both the cams 20*b* and 21*b* will not be located on the frame 14*a*. When either of the cam 20*b* or 21*b* is disposed on the frame body 14*a* and if the cartridge 14 is inserted into the machine body B in place, that cam will actuate the associated microswitch MS 20*a* or 20*b*.

In the illustrated embodiment, the microswitches MS 20*a* and 21*a* are also used to regulate the amount of the pre-exposure light depending on the sensitivity of the photosensitive member used, so that the quality of the resulting image will more be improved.

If the lower sensitivity photosensitive member is used, the amount of pre-exposure light will be increased to produce more photo-carrier in the photosensitive member. Thus, the sensitivity of that photosensitive member will, in effect, be increased to decrease the necessary power of the laser beam. This is effective if the power of the semiconductor laser is not satisfactory. Furthermore, the increase of the pre-exposure light causes the ghost effect or the rising of potential to reduce.

For the higher photosensitive member, the decrease of the pre-exposure light is effective for preventing any degradation of the photosensitive member, the falling of potential or the like.

It is thus understood that the quality of the resulting images can more be improved by changing both the power of laser beam and the amount of the pre-exposure light in accordance with the sensitivity of the photosensitive member used.

Figure 5:
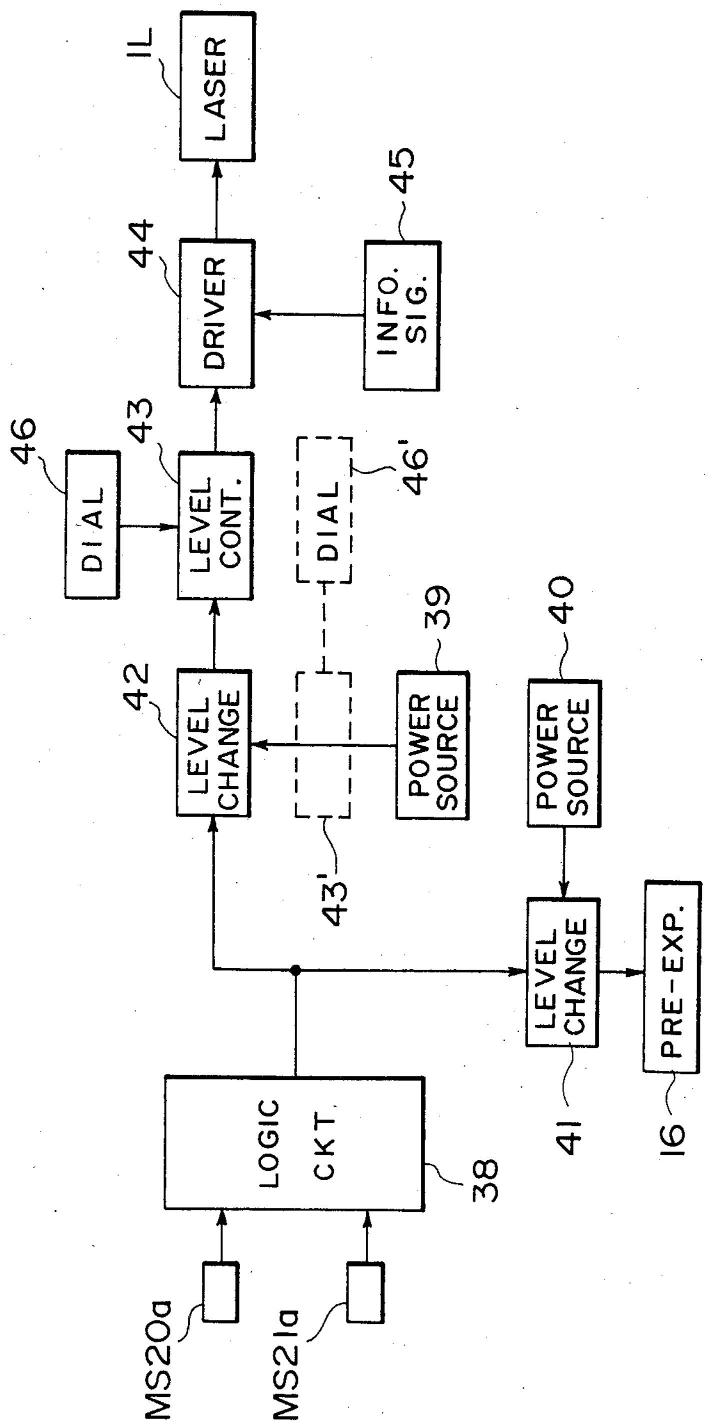
FIG. 5 is a block diagram showing one example of the control means.

Referring to FIG. 5, signals from the microswitches MS 20*a* and 21*a* are supplied to a logic circuit 38 which is formed by suitably combining inventors and AND gates. This logic circuit 38 is adapted to produce a first signal when the microswitch MS 20*a* is turned on; a second signal when the microswitch MS 21*a* is turned on; and a third signal when both the microswitches MS 20*a* and 21*a* are turned off. Signal from the logic circuit 38 is supplied to a level changing circuit 41 which is adapted to change the level of a voltage applied from a supply of power 40 to the source of pre-exposure light 16. The level changing circuit 41 will change the voltage to be applied to the light source 16 to either of low, middle or high depending on the first, second and third signals, respectively, so that the amount of a light for illuminating the photosensitive member in the pre-exposure mode will be changed to either of small, middle or large.

The above first, second and third signal are also supplied to a level changing circuit 42 which is adapted to change the output level of a power supply 39 for energizing the semiconductor laser 1L. This level changing circuit 42 will change the current from the power supply 39 to either of low, middle or high, depending on the first, second and third signals, respectively. The level-changed current from the power supply 39 is further level-changed through a level control circuit 43 such as a variable resistor manually controlled by a dial 46 in accordance with the wavelength of a laser beam used, and thereafter supplied to a laser drive circuit 44. The above level control circuit 43 is disposed in the machine body B and has its variable resistance controlled in accordance with the wavelength of the oscillated beam from the semiconductor laser contained in the machine body B. In other words, the control of the resistance in the level control circuit 43 is such that as the wavelength of a laser beam is larger, the current energizing the laser is increased to increase the amount of exposure light to the photosensitive member. For example, if the standard photosensitive member is used, the level of the current supplied to the laser 1L through the circuit 42 is changed to middle level. However, the actual current level to the laser 1L is further corrected in accordance with the wavelength of the laser beam used. That is, if the wavelength of the oscillated beam from the used semiconductor laser is in the range not lower than 780 nm and not higher than 785 nm, the beam power is the value shown by Ⓕ in FIG. 3. If the wavelength is larger than 785 nm but equal to or smaller than 790 nm, the beam power will be equal to the value shown by Ⓘ in FIG. 3. When the higher photosensitive member is used and if the wavelength of the oscillated beam from the used semiconductor laser is in the range not lower than 780 nm and not higher than 785 nm, the beam power will be equal to the value shown by Ⓖ in FIG. 3. If the wavelength is larger than 785 nm but equal to or smaller than 790 nm, the beam power will be the value at Ⓙ in FIG. 3.

The above embodiment changes the output level of the power supply 39 through the circuit 42 in accordance with the sensitivity of the photosensitive member and further regulates the changed level through the circuit 43 in accordance with the oscillated wavelength of the semiconductor laser to determine the actual current level applied to the laser. Alternatively, a level control circuit 43' such as a variable resistor controlled manually by a dial 46' may be utilized to regulate the level of the current applied to the level change circuit 42 depending on the wavelength of the laser beam, i.e., to increase the current level for longer wavelengths and to decrease the current level for shorter wavelengths, and then such regulated current is used as a reference level such that the current applied to the laser 1L will be changed to either of high, middle or low level in response to the respective three signals described hereinbefore.

In the former case, it can be said that the upper and lower limits of the power of laser beam controlled depending on its own wavelength can be set in accordance with the sensitivity of a photosensitive member used. In the latter case, it can be said that the upper and lower limits of the power of laser beam controlled depending on the sensitivity of a photosensitive member can be set in accordance with the wavelength of the laser beam. Alternatively, a microcomputer 50 may be utilized as control means which includes a memory adapted to store various values of beam power corresponding to the respective combinations of sensitivity data and wavelength data. In operation, sensivity data of a photosensitive member used and wavelength data of a semiconductor laser used are supplied to the input of the microcomputer to read a beam power value matching the corresponding combination of these data from the above memory. The read data of the beam power value is then utilized to determine the level of a laser drive current.

Figure 6:
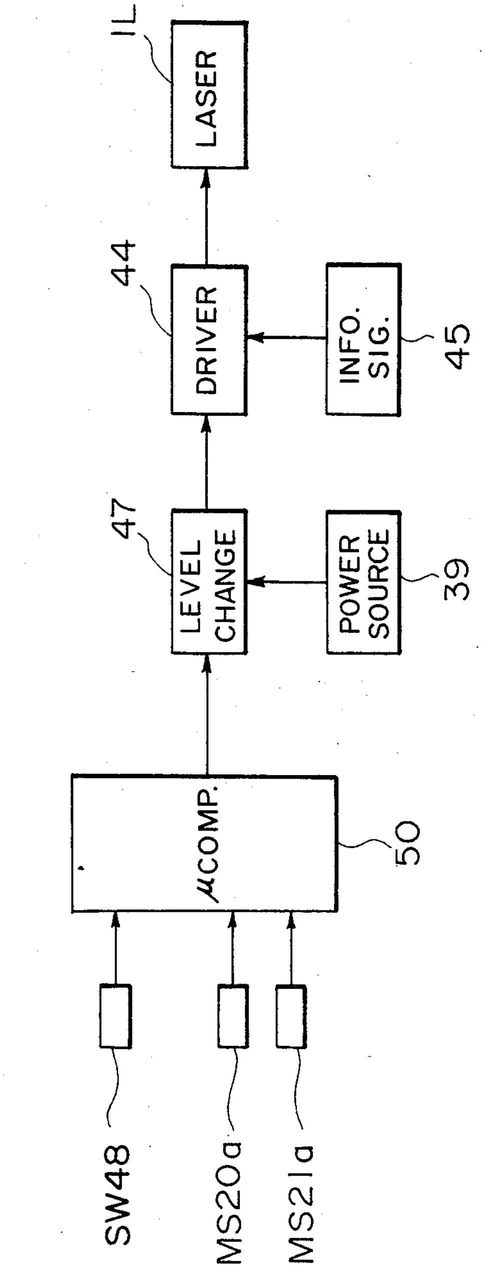
FIG. 6 is a block diagram showing the other example of the control means.
Figure 7:
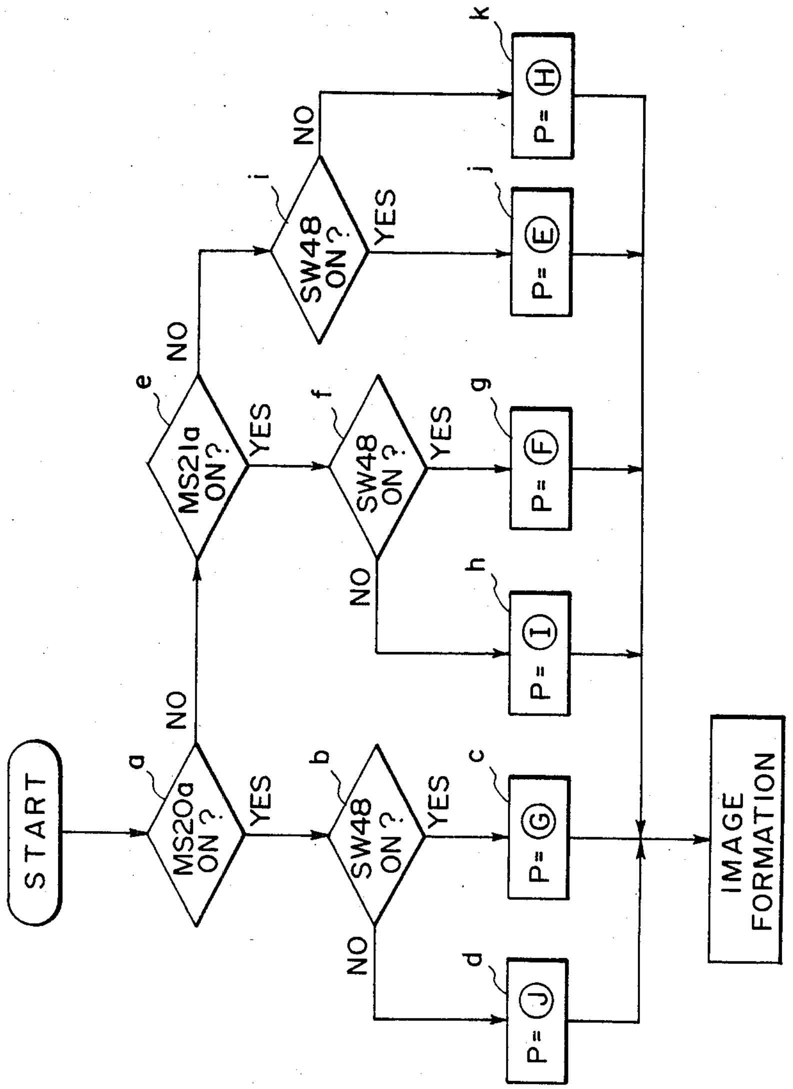
FIG. 7 is an operational flow chart of the control means shown in FIG. 6.

As shown in FIG. 6, namely, the microcomputer 50 receives signals from said microswitches MS20*a*, MS21*a* and a signal from a switch SW48 which is manually turned on at a laser beam wavelength betweem 780 nm and 785 nm and turned off at a laser beam wavelength larger than 785 nm but equal to or smaller than 790 nm. The memory of the microcomputer 50 stores said laser beam power data Ⓔ to Ⓙ corresponding to the respective combination of said three sensitivity data and said two wavelength data. As shown in FIG. 7, thus, the microcomputer 50 discriminates at Step a whether or not the microswitch MS20*a* is in its ON state. If "Yes", the microcomputer 50 discriminates at Step b whether or not the switch SW48 is in its ON state. If also "Yes", the microcomputer 50 supplies a setting signal to the level changing circuit 47 such that the beam power P will be set at Ⓖ. If "No" at step b, the microcomputer 50 supplies a signal to the circuit 47 at Step d such that the beam power P will be set at J.

If the discrimination is "No" at Step a, the microcomputer 50 discriminates at Step e whether or not the microcomputer MS21*a* in its On state. If "Yes", the microcomputer 50 discriminates at Step f whether or not the switch SW48 is in its ON state. If "Yes", the microcomputer 50 supplies, at Step g, a signal to the level changing circuit 47 such that the beam power P will be set at Ⓕ. If "No" at Step f, the microcomputer 50 supplies a setting signal to the circuit 47 so that the beam power P will be set at Ⓘ, at Step h.

If the discrimination is "No" at the Step e, the microcomputer 50 discriminates at Step i whether or not the switch SW48 is in its ON state. If "Yes", the microcomputer 50 supplies a setting signal to the circuit 47 such that the beam power will be set at Ⓔ, at Step j. If "No", the microcomputer 50 supplies a setting signal to the circuit 47 such that the beam power will be set at Ⓗ.

On the completion of the setting of the laser drive current, that is, the setting of the laser beam power, a laser beam having the set power is used to initiate any well-known image formation.

In any event, the level of the current applied to the laser 1L may be selected depending on the wavelength of the oscillated beam in this laser 1L and the sensitivity of a photosensitive member used. Therefore, the laser beam power may satisfactorily be selected for the sensitivity of any photosensitivity member and/or the wavelength of any semiconductor laser to sufficiently suppress the variation in the bright-area potential of the photosensitive member such that the density of image will be maintained substantially constant.

In this connection, the laser 1L is on-off modulated by said source of information signal to be recorded 45 through the drive circuit 44 under the selection of current levels as described hereinabove.

In the above embodiments, none of the cams 20*b* and 21*b* are used if the photosensitive member contained into the cartridge is less sensitive. Alternatively, both the cams 20*b* and 21*b* may be utilized.

Although the previous embodiments have been described as to the beam power regulated by adjusting the current applied to the laser, there may be provided a set of light attenuating filters corresponding to the sensitivities of photosensitive members and a plurality of light attenuating filters corresponding to the wavelengths of oscillated laser beams. These filters are selectively disposed across the optical path to obtain a necessary combination matching the required laser beam wavelength and sensitivity. As a result, a laser beam having the desired power can be obtained. The photosensitive member is scanned by this laser beam to obtain the desired bright-area potential thereon.

The chargeability of the photosensitive members may be varied in accordance with the conditions of manufacturing it. If such a variation is broad, the surface potentials on the photosensitive members are different from one another for the same corona discharge so that no good image will be obtained. It is thus preferred that the corona discharge can be controlled by controlling the power of the charger 4 depending on the chargeability of the photosensitive member to maintain the surface potential substantially constant after the photosensitive member has been charged for sensitization. This enhances the advantages of the beam power adjustment.

Figure 8:
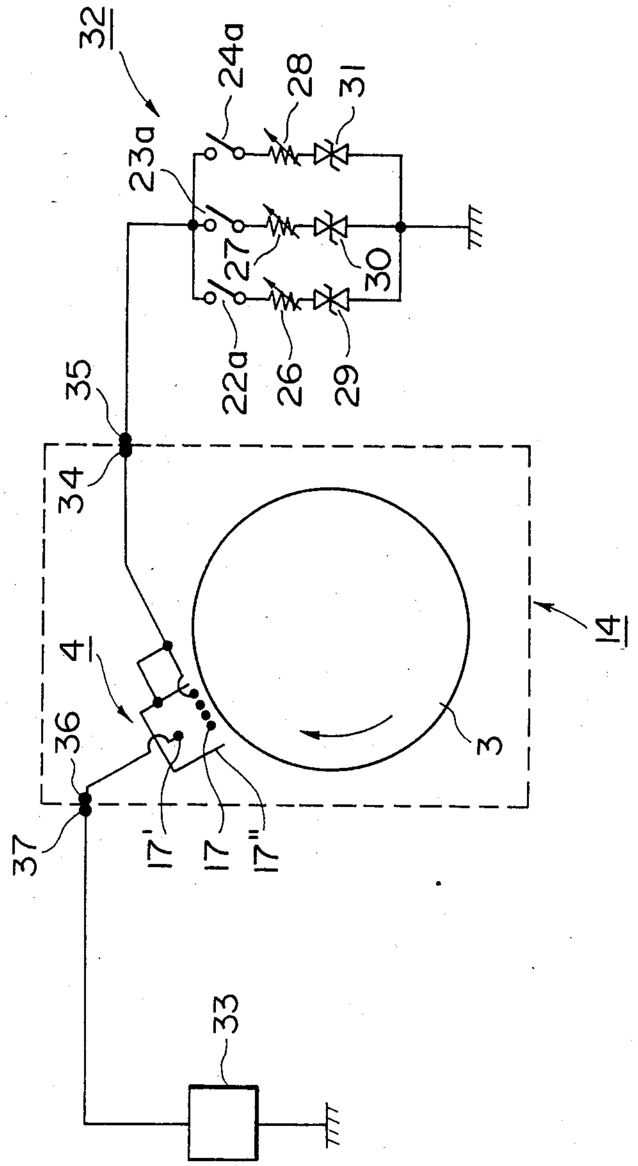
FIG. 8 is a schematic view of means for controlling a charger.

In an embodiment shown in FIG. 8, thus, a constant voltage generating means 32 is connected with the grid 17 and shield member 17'' of the charger 4. The constant voltage generating means 32 is located within the machine body B. The microswitches MS22*a*, 23*a* and 24*a* are respectively connected in series with variable resistances 26, 27 and 28 (may be fixed resistances) and constant voltage elements 29, 30 and 31 such as varisters, Zener diodes or the like . These constant voltage elements are electrically grounded. The sets of elements (26, 29; 27, 30; 28, 31) are respectively adapted to serve as voltage forming means for photosensitive members of higher, standard and lower charging abilities. The constant voltage characteristics and variable resistances in each of the sets may be regulated depending on the chargeability of a photosensitive member used such that the voltage to be applied to the grid 17 and shield member 17" will be determined to maintain the surface potential of that photosensitive member substantially constant for any chargeability. In other words, if the photosensitive member mounted in the cartridge 14 has its higher chargeability, the cam 22*b* is mounted on the frame body 14*a* of the cartridge 14. For the standard chargeability, the cam 23*b* is mounted on the frame body 14*a*. For the lower chargeability, the cam 24*b* is mounted on the frame body 14*a*. When such a cartridge 14 is inserted into the machine body B of the electrophotographic apparatus, the cam 22*b*, 23*b* or 24*b* actuates the microswitch MS22*a*, MS23*a* or MS24*a*, respectively. When the electrode 17' is energized to initiate corona discharge, a portion of the corona discharge is caught by the shield member 17" and grid 17 to flow into the variable resistance and constant voltage element corresponding to the selected one of the microswitches MS22*a*, 23*a* and 24*a* therethrough. This produces a voltage corresponding to the chargeability of the photosensitive member. Thus, the corresponding potential is generated on the grid 17 and shield member 17". In such a manner, the amount of the corona discharge applied to the photosensitive member can be controlled depending on the chargeability of the photosensitive member. Therefore, variations of the potential due to the variation of chargeability of photosensitive members after being charged for sensitization may be suppressed to more stabilize the quality of image together with the advantage of said beam power adjustment.

As shown in FIG. 8, contacts 34 and 36 are mounted on the frame 14*a* of the cartridge 14 and respectively connected with the grid 17, shield member 17" and discharge electrode 17'. The other contacts 35 and 37 are mounted in the machine body B and respectively connected with the constant voltage forming means 32 and high-voltage source 33. When the cartridge 14 is mounted in the machine body B, the contacts 34 and 35 are connected respectively with the contacts 36 and 37 such that the constant voltage generating means 32 is connected with the grid 17 and shield member 17" while at the same time the power supply 33 is connected with the electrode 17'.

In such an arrangement as shown in FIG. 8, the grid 17 may be omitted or the shield member 17" may electrically be grounded.

Although the previous embodiments have been described as to the microswitches mounted in the machine body of the electrophotographic system which are adapted to be actuated by the cam means mounted on the cartridge to select the amount of laser beam, the microswitches may be replaced by any suitable means, such as photo-interrupters.

Although the previous embodiments have been described as to the automatic change of laser beam by the change of the cartridge, the photosensitive member may solely be exchanged rather than the cartridge. Alternatively, any suitable changing switch may be provided in the machine body of the electrophotographic system. When the changing switch is changed from one position to another position in accordance with an indication printed on a photosensitive member to be used, the power of the laser beam will be determined depending on the sensitivity of that photosensitive member.

While the invention has been described with reference to the structures disclosed herein, it is not confined to the details set forth and this application is intended to cover such modifications or changes as may come within the purpose of the improvements or the scope of the following claims.

What is claimed is:

1. An image information recording apparatus comprising:

a movable photosensitive member movable by a pre-exposure station, charging station, laser beam exposure station, developing station and transfer station in the order named;

information beam producing means for producing a laser beam corresponding to an information signal of an image to be recorded;

pre-exposure means, located at said pre-exposure station, for substantially uniformly exposing said photosensitive member to illumination light;

charging means, located at said charging station, for charging said photosensitive member;

optical means for scanningly deflecting said laser beam to expose said photosensitive member to the laser beam at said laser beam exposure station;

laser beam power control means for controlling power of the laser beam incident on said photosensitive member in accordance with the wavelength of said laser beam and sensitivity of said photosensitive member; and pre-exposure control means for controlling the power of the illumination light from said pre-exposure means in accordance with the sensitivity of said photosensitive member;

wherein said laser beam power control means and said pre-exposure control means includes a common detection means for detecting the sensitivity information of a photosensitive member mounted in said apparatus, and wherein, in response to the signal from said detection means, said laser beam power control means controls the power of the laser beam, and said pre-exposure control means controls the power of the illumination light.

2. An image information recording apparatus as defined in claim 1, wherein said pre-exposure control means includes means for controlling a level of a drive current applied to said pre-exposure means in accordance with the sensitivity of said photosensitive member.

3. An image information recording apparatus comprising:

a semiconductor laser for producing a laser beam corresponding to an information signal of an image to be recorded;

means for detachably supporting a cartridge containing a movable photosensitive member, wherein said cartridge is provided with means for representing sensitivity information of the photosensitive member contained therein;

optical means for scanningly deflecting said laser beam and exposing said movable photosensitive member to the laser beam; and control means including means for holding wavelength information controlled in accordance with laser beam wavelength information peculiar to said laser in said apparatus and detecting means cooperable with the representing means of the cartridge, when supported by said supporting means, to detect the sensitivity information of the photosensitive member contained in the cartridge, said control means controlling power of the laser beam in accordance with the wavelength information held in said holding means and the sensitivity information detected by said detecting means.

4. An image information recording apparatus as defined in claim 3, wherein said control means includes level control means for controlling a level of a drive current to be applied to said semiconductor laser in accordance with the sensitivity information detected by said detecting means and the wavelength information held by said wavelength information holding means.

5. An image information recording apparatus as defined in claim 3, wherein said control means controls, in accordance with the wavelength information held by said holding means, the upper and lower limits of a range of the power within which the laser beam is controlled in accordance with the sensitivity information detected by said detecting means.

6. An image information recording apparatus as defined in claim 4, wherein said control means includes first control means for controlling a level of current in accordance with the wavelength information held in said holding means and second control means for controlling a level of said drive current in accordance with the sensitivity information detected by said detecting means and on the basis of the current level controlled by said first control means.

7. An image information recording apparatus as defined in claim 3 wherein said control means controls, in accordance with the sensitivity information detected by a range of the power within which the laser beam is controlled in accordance with the wavelength information held in said holding means.

8. An image information recording apparatus as defined in claim 4, wherein said control means includes first control means for controlling a level of current in accordance with the sensitivity information detected by said detecting means and second control means for controlling a level of said drive current in accordance with the wavelength information held in said holding means.

9. An image information recording apparatus as defined in claim 3, wherein said control means selects, among the powers corresponding to combinations of sensitivity information data and wavelength information data, a power corresponding to the combination of the sensitivity information detected by said detecting means and the wavelength information held by said holding means.

10. An image information recording apparatus as defined in claim 4, wherein said control means selects, as the level of the drive current, from a plurality of current levels predetermined corresponding to combinations of sensitivity information data and wavelength information data, a current level adapted to a combination of the sensitivity information detected by said detecting means and wavelength information held by said holding means.

11. An image information recording apparatus as defined in claim 10, wherein said control means stores said plurality of current levels and produces laser driving current information adapted to the combination of the sensitivity information detected by said detecting means and wavelength information held by said holding means.

12. An image information recording apparatus as defined in any one of claims 3 to 11, wherein said wavelength information holding means is adapted to receive the wavelength information manually inputted.

13. An image information recording apparatus comprising:

a laser for producing a laser beam corresponding to an information signal of an image to be recorded;

supporting means for detachably supporting a cartridge including a movable photosensitive member movable by a pre-exposure station, charging station, laser beam exposure station, developing station and transfer station in the order named, said cartridge being provided with means for representing sensitivity information of the photosensitive member contained therein;

optical means for scanningly deflecting said laser beam to expose said photosensitive member to the laser beam of said laser beam exposure station; and laser beam power control means, said control means includes means for receiving manually inputted wavelength information peculiar to said laser in said apparatus and detecting means cooperable with the representing means of the cartridge, when supported by said supporting means, to detect the sensitivity information of the photosensitive member contained in the cartridge, said control means controlling power of the laser beam incident on the photosensitive member in accordance with the wavelength information inputted into said wavelength information receiving means and the sensitivity information detected by said detecting means.

14. An image information recording apparatus as defined in claim 13, wherein said control means includes level control means for controlling a level of a drive current to be applied to said laser in accordance with the sensitivity information detected by said detecting means and the wavelength information manually inputted to said wavelength information receiving means.

15. An image information recording apparatus as defined in claim 13 wherein said control means controls, in accordance with the wavelength information manually inputted to said receiving means, the upper and lower limits of a range of the power within which the laser beam is controlled in accordance with the sensitivity information detected by said detecting means.

16. An image information recording apparatus as defined in claim 14, wherein said control means includes first control means for controlling a level of current in accordance with the wavelength information manually inputted to said receiving means and second control means for controlling a level of said drive current in accordance with the sensitivity information detected by said detecting means and on the basis of the current level controlled by said first control means.

17. An image information recording apparatus as defined in claim 13, wherein said control means controls, in accordance with the sensitivity information detected by said detecting means, the upper and lower limits of a range of the power within which the laser beam is controlled in accordance with the wavelength information manually inputted to said receiving means.

18. An image information recording apparatus as defined in claim 14, wherein said control means include first control means for controlling a level of current in accordance with the sensitivity information detected by said detecting means and second control means for controlling a level of said drive current in accordance with the wavelength information manually inputted to said receiving means.

19. An image information recording apparatus as defined in claim 13, wherein said control means selects, among the power levels corresponding to combinations of sensitivity information data and wavelength information data, a power level corresponding to the combination of the sensitivity information detected by said detection means and the wavelength information inputted to said recording means.

20. An image information recording apparatus as defined in claim 14, wherein said control means selects, as the level of the drive current, from a plurality of current levels predetermined corresponding to combinations of sensitivity information data and wavelength information data, a current level adapted to a combination of the sensitivity information detected by said detecting means and wavelength information manually inputted to said receiving means.

21. An image information recording apparatus as defined in claim 20, wherein said control means stores said plurality of current levels and produces laser driving current information adapted to the combination of the sensitivity information detected by said detecting means and wavelength information manually inputted to said receiving means.

22. An image information recording apparatus as defined in any one of claims 13 to 21, further including pre-exposure control means for controlling a level of a drive current applied to pre-exposure means located at said pre-exposure station in accordance with the sensitivity information detected by said detecting means.

23. An image information recording apparatus as defined in any one of claims 13 to 21, wherein the cartridge further includes second representing means for representing chargeability information of the photosensitive member contained in the cartridge, and wherein said apparatus further comprises charge control means including second detecting means for cooperating with the second representing means of the cartridge when supported by said supporting means, said charge control means controlling charging means located at said charging station in accordance with the chargeability information detected by said second detecting means.

24. An image information recording apparatus as defined in claim 23, wherein said charging means includes a corona discharge electrode, a shield member and a grid member, and wherein said charge control means includes voltage means for providing a plurality of different voltages and selection means for selecting and applying a voltage corresponding to the chargeability information detected by said second detecting means to at least one of said shield member and grid member.

* * * * *

UNITED STATES PATENT AND TRADEMARK OFFICE
CERTIFICATE OF CORRECTION

PATENT NO. : 4,563,694

DATED : January 7, 1986

INVENTOR(S) : MASAHARU OHKUBO, ET AL.

It is certified that error appears in the above-identified patent and that said Letters Patent is hereby corrected as shown below:

Column 1, line 61, change "chargeeability" to --chargeability--.

Column 2, line 23, change "oscilated" to --oscillated- and
line 63, change "reduce period" to --reduced period--.

Column 3, line 32, delete "after the pre-exposure step"; and
line 57, change "them, may be" to --them, be--.

Column 4, line 36, delete "is".

Column 5, line 21, change "variations range" to --variation range--.

Column 7, line 33, change "sensivity data" to --sensitivity data--;
line 44, change "betweem" to --between--;
line 58, change "step b," to --Step b,--;
line 60, change "at J." to --at (J).--; and
line 63, change "On state." to --ON state.--

Column 8, line 3, change "the Step e, to --Step e,--;
line 4, change "at Step i" to --at Step i--;
line 20, change "photosensitivity member" to --photosensitive member--;
line 26, "source of information signal to be recorded 45" to -- source 45 of an information signal to to be recorded --;

UNITED STATES PATENT AND TRADEMARK OFFICE

CERTIFICATE OF CORRECTION

PATENT NO. : 4,563,694 Page 2 of 2

DATED : January 7, 1986

INVENTOR(S) : MASAHARU OHKUBO, ET AL.

It is certified that error appears in the above-identified patent and that said Letters Patent is hereby corrected as shown below:

Column 8, line 29, change "embodiments," to --embodiment,--;
line 36, change "light attenuating" to --light-attenuating--; and
lines 37-38, change "light attenuating" to --light-attenuating--.

Column 11, line 33, change "3 wherein" to --3, wherein--.

Column 12, line 44, change "13 wherein" to --13, wherein--; and
line 67, change "include" to --includes--.

Signed and Sealed this

*Second* Day of *September 1986*

[SEAL]

*Attest:*

DONALD J. QUIGG

*Attesting Officer* *Commissioner of Patents and Trademarks*